United States Patent Office 3,702,811
Patented Nov. 14, 1972

3,702,811
PROCESS FOR RENDERING STYRENE COLORLESS BY ARTIFICIAL LIGHT IRRADIATION
Raymond A. Newsom and Richard K. McLeod, Dickinson, and Norman L. Ruland, Houston, Tex., assignors to Monsanto Company, St. Louis, Mo.
No Drawing. Filed July 21, 1971, Ser. No. 164,929
Int. Cl. B01d 1/10; C07c 3/24
U.S. Cl. 204—158 R                       5 Claims

ABSTRACT OF THE DISCLOSURE

The process for the removal of color from styrene by treating colored styrene with artificial light having a wavelength of from 3000 to 7000 angstroms.

---

This invention is related to a process for rendering styrene colorless. More particularly it relates to a process for removing color that develops in commercial styrene during storage and shipping.

In the manufacture of styrene by the dehydrogenation of ethyl benzene polymerization inhibitors are employed in the distillation train for the separation of the commercial styrene monomer from the other reaction products. However, the most frequently employed of such inhibitors are removed from the purified monomer stream by the final distillation step. Thereafter, for the protection of the styrene monomer from polymerization while stored or shipped, it is common practice to add an inhibitor or a mixture of them to the styrene. The most commonly employed inhibitors are of the dihydroxybenzene type, e.g. para-tertiary-butylcatechol, pyrocatechol, pyrogallol, and the like. These inhibitors effectively prevent the formation of polymer in the monomer while stored or shipped, and in the amounts usually employed do not interfere with the intended use of the monomer in subsequent polymerizations or other uses. Therefore, generally they do not require removal before use of the styrene.

However, it has been observed that upon storage of styrene in the presence of air or oxygen, a certain amount of yellow, amber or green-yellow color often develops which renders the styrene monomer unsuitable for many intended uses. Heretofore removal of such color which developed upon storage has required reprocessing the styrene by flash distillation or filtration through activated alumina or other clarifying media. This is an expensive step for treating a large amount such as a barge load, tanker load or large storage tank full of styrene. Likewise such reprocessing results in removal of the inhibitor or inhibitors present and such inhibitor must be replaced after reprocessing to again render the styrene stable in storage or shipping.

Although the present invention is not to be limited to any particular theory as to the source of the color observed, it is believed to arise as the result of oxidation of the polyhydroxybenzene inhibitor to a quinone type compound which is the color body present. Such an oxidation product can be formed whenever styrene monomer containing a polyhydroxybenzene inhibitor is stored in the presence of oxygen, though it generally does not. What other factors influence its formation are not fully understood. Moreover, there are other sources of color found at times in styrene monomer due to metallic and other impurities to which the present invention does not relate and to which it is not directed.

It has now been found that exposure to artificial light having a wavelength of from 3000 to 7000 angstroms will render water-white styrene which has developed such color due to storage in the presence of oxygen. This discovery makes possible the decolorizing of styrene which has developed such color by a simple process which does not require removal of the inhibitors previously present. Artificial light having a wavelength between 3000 and 7000 angstroms is effective to rapidly remove the color which has developed in commercial styrene monomer upon storage under the above conditions. It has been found that the color bodies which develop under these conditions in commercial styrene monomer containing dihydroxybenzene type inhibitors, absorb light most strongly in the range of from about 4000 to about 4300 angstroms and, consequently, artificial light having its major wavelength within this range is the most preferred in the present process. However, most economical sources of artificial light do not emit light of wavelengths of such a narrow band, and it has been found quite suitable to employ artificial light sources emitting light over a very broad band of the spectrum, i.e. 3000 to 7000 angstroms. Such broad spectrum artificial light sources have been found very suitable in carrying out the process of the present invention.

The present process employing artificial light has many advantages. Although the same portion of the light spectrum is embraced by the broader spectrums of daylight or normal sunlight, there is also present in such spectrums light in the ultra violet region below 3000 A., see Barrow, Introduction to Molecular Spectroscopy, McGraw-Hill (1962). It is known that uninhibited styrene monomer is polymerized rather readily by light in the ultra violet region of the spectrum below 3000 A. Consequently, it would be expected that the stabilization of commercial styrene monomer to prevent the formation of polymer if exposed to light containing such UV wavelengths would require greater amounts of inhibitors than the very small amounts generally employed. Therefore, to avoid any possibility of the formation of polymer in stored styrene monomer and to avoid the use of greater and less economical amounts of inhibitors, exposure to light in the ultra violet region below 3000 A. is to be avoided.

Likewise, the use of artificial light in the band of wavelengths specified offers the advantage of the ability to treat the styrene over twenty-four hour periods without dependence upon the presence of normal daylight or sunlight. Thus, this color which develops in stored styrene can be efficiently and effectively removed in less total time even for very large volumes of styrene monomer, because treatment can be carried out around the clock. Likewise, since sources of artificial light are adaptable to projection over relatively small areas, such treatments can be carried out on relatively small volumes of the styrene monomer on a continuous or a semi-continuous basis so that large numbers of sources of artificial light are not required. Other advantages in the use of artificial light within the specified band of wavelengths will be apparent to those skilled in the art.

The intensity of the artificial light source employed is not critical. Thus, the size and power of the light source can be readily adapted to suit the volume of styrene monomer to be treated which affords great flexibility in application of the process. It has been found that the removal of color from styrene which has developed color upon storage occurs quite rapidly in those volumes of styrene exposed to the light, that is, that portion of the styrene monomer which the incident artificial light penetrates. Hence, retreatment of the same volumes of liquid monomer are not required in the absence of development of further color upon additional storage. The following examples will illustrate the application of the present invention, but are not to be construed as limiting the scope of the invention claimed.

In the examples below the stored styrene monomer was exposed to a modified color improved mercury vapor lamp of 250 watts. The lamp has a phosphor coating which converts the mercury vapor arc output to spectral energy in the 3000 to 7000 angstrom range, and is rated at approximately 10,500 lumens. The lamp is mounted one foot from a sight glass with a 5¾ inch round glass window mounted in a T in a 6 inch pipe. The lamp and sight glass were located in a pumped recirculating line which recirculates styrene monomer stored in a 126,000 gallon storage tank. The color of the styrene monomer is expressed in APHA units and was determined by a Lumetron TR Model 450 colorimeter as percent transmission of light, which readings are converted to APHA units of color. A value of about 10 APHA units appears water-white to the naked eye.

EXAMPLE I

Approximately 400,000 pounds of monomeric styrene containing initially about 10–15 parts by weight of tert.-butylcatechol per million parts of styrene stored in the storage tank in which the color improved mercury vapor lamp and sight glass described above were installed in a 6 inch recirculating line was maintained at the indicated color value by exposing the recirculated portion of the styrene monomer to artificial light with a spectrum of from 3000 to 7000 angstroms as set out in the following table. The tank was charged with additional increments of styrene with inhibitor and increments of styrene were withdrawn during this period.

TABLE 1

| Day: | APHA color |
|---|---|
| 1 | 5 |
| 2 | 5 |
| 3 | 7 |
| 4 | 5 |
| 5 | 6 |
| 6 | 1 |
| 7 | 6 |
| 8 | (1) |

¹ Transferred to tank without facility to expose to light.

Approximately 400,000 pounds of monomeric styrene stored in a similar tank without facility for exposure to light and initially containing about 10–15 parts by weight of tert.-butylcatechol per million parts of styrene began to develop a yellow color upon daily color sampling. Such daily color readings are set out in the following table. During this period no additions or withdrawals of styrene were made to this tank.

TABLE 2

| Day: | APHA color |
|---|---|
| 1 | 4 |
| 2 | 5 |
| 3 | 12 |
| 4 | 13 |
| 5 | 18 |
| 6 | 20 |
| 7 | 23 |

On the 8th day of the period the 400,000 pounds of styrene were transferred to the tank provided with the facility for exposure to artificial light with a spectrum of from 3000 to 7000 angstroms and portions were recirculated continuously through the associated 6 inch line for the succeeding 4 days. No additions or withdrawals of styrene were made during this period. The results of such treatment as reflected by daily color sampling are set out in the following table.

TABLE 3

| Day: | APHA color |
|---|---|
| 9 | 22 |
| 10 | 16 |
| 11 | 15 |
| 12 | 13 |

After sampling on the 12th day the styrene was considered sufficiently decolored for blending with the styrene of Example I. This blend demonstrated a color of approximately 8 APHA units and appeared water-white.

EXAMPLE III

A sample of severely discolored styrene monomer was obtained from a barge in which it had been stored exposed to oxygen for several weeks. The monomer had initially contained approximately 15 parts by weight of tert.-butylcatechol per million parts of styrene. The sample had an initial APHA color of 25. A glass colorimeter cell was filled with the sample of colored styrene and exposed to artificial light from two fluorescent lamps mounted in a tracing board base rated at 55 watts. The cell was mounted eight inches from the surface of the lights with a white reflecting surface placed about six inches on the opposite side of the cell from the lights. Periodically the percent transmittance and APHA color of the sample was determined in the colorimeter until the sample appeared white to the naked eye. The results of this test are set out below.

TABLE 4

| Time (minutes): | APHA color |
|---|---|
| 0 | 25 |
| 60 | 23 |
| 90 | 22 |
| 210 | 16 |
| 375 | 11 |

What is claimed is:

1. A process for decolorizing styrene monomer which comprises exposure of monomeric styrene containing a polyhydroxy benzene inhibitor which has developed color during storage or shipping in the presence of oxygen to artificial light having a wavelength of from 3000 to 7000 angstroms.

2. The process of claim 1 wherein the artificial light has a wavelength of from 4000 to 4300 angstroms.

3. The process of claim 1 wherein the polyhydroxybenzene inhibitor is p-tert.-butylcatechol.

4. The process of claim 1 wherein the polyhydroxybenzene inhibitor is pyrocatechol.

5. The process of claim 1 wherein the polyhydroxybenzene inhibitor is pyrogallol.

References Cited

UNITED STATES PATENTS 3,405,045   10/1968   Hoskins   204—158 R
3,121,633   2/1964   Sprague et al.   204—158 R
2,914,452   11/1959   Schutze et al.   204—158 HE JOHN H. MACK, Primary Examiner R. L. ANDREWS, Assistant Examiner U.S. Cl. X.R.

204—162 R